(12) United States Patent
Honkanen et al.

(10) Patent No.: US 10,793,789 B2
(45) Date of Patent: Oct. 6, 2020

(54) PROCESS AND APPARATUS FOR HYDROGENATION

(71) Applicant: Neste Oyj, Espoo (FI)

(72) Inventors: Hanna Honkanen, Porvoo (FI); Antti Kurkijärvi, Porvoo (FI); Mauri Suuronen, Porvoo (FI); Sami Toppinen, Porvoo (FI); Jan Wahlström, Porvoo (FI)

(73) Assignee: NESTEC OYJ, Espoo (FI)

( * ) Notice: Subject to any disclaimer, the term of this patent is extended or adjusted under 35 U.S.C. 154(b) by 0 days.

(21) Appl. No.: 16/374,235

(22) Filed: Apr. 3, 2019

(65) Prior Publication Data

US 2019/0309230 A1    Oct. 10, 2019

(30) Foreign Application Priority Data

Apr. 5, 2018 (FI) ..................... 20185316

(51) Int. Cl.
*C10G 65/08* (2006.01)
*B01J 4/00* (2006.01)
(Continued)

(52) U.S. Cl.
CPC .............. *C10G 65/08* (2013.01); *B01J 4/001* (2013.01); *B01J 19/245* (2013.01); *C10G 45/32* (2013.01); *C10G 45/44* (2013.01); *C10G 65/06* (2013.01); *B01J 2204/002* (2013.01); *C10G 2300/1011* (2013.01); *C10G 2300/1044* (2013.01); *C10G 2300/1088* (2013.01); *C10G 2300/1096* (2013.01); *C10G 2300/301* (2013.01); *C10G 2300/4012* (2013.01)

(58) Field of Classification Search
CPC ........ C10G 65/06; C10G 65/08; C10G 45/32; C10G 45/36; C10G 45/44; C10G 45/48; C10G 2300/1011; C10G 2300/1044; C10G 2300/1088; C10G 2300/1096; C10G 2300/301; C10G 2300/4012; B01J 4/001; B01J 19/245; B01J 23/755; B01J 2204/002

See application file for complete search history.

(56) References Cited

U.S. PATENT DOCUMENTS 3,494,859 A    2/1970  Parker
5,958,218 A    9/1999  Hunter et al.
(Continued)

FOREIGN PATENT DOCUMENTS

CN    1400285 A    3/2003
CN    101307257 A  11/2008
(Continued)

OTHER PUBLICATIONS

The Russian Search Report dated Jul. 25, 2019, by the Russian Patent Office in corresponding Russian Application No. 2019109657/04. (2 pages).

(Continued)

*Primary Examiner* — In Suk C Bullock
*Assistant Examiner* — Jason Y Chong
(74) *Attorney, Agent, or Firm* — Buchanan Ingersoll & Rooney PC

(57) ABSTRACT

The present disclosure relates to hydrogenation reactions of different fractions in oil refining. It also relates to a process device applicable thereto for hydrogenation of various feedstocks, such as arrangements during campaign changes.

19 Claims, 1 Drawing Sheet

(51) Int. Cl.
*B01J 19/24* (2006.01)
*C10G 45/32* (2006.01)
*C10G 45/44* (2006.01)
*C10G 65/06* (2006.01)

(56) References Cited

U.S. PATENT DOCUMENTS

| | | |
|---|---|---|
| 6,693,225 B2 | 2/2004 | Boyer et al. |
| 7,384,540 B2 | 6/2008 | Galeazzi |
| 8,888,990 B2 | 11/2014 | Zimmerman et al. |
| 9,732,286 B2 | 8/2017 | Candelon et al. |
| 10,047,305 B2 | 8/2018 | Aubry et al. |
| 2002/0004622 A1 | 1/2002 | Dai et al. |
| 2005/0167334 A1 | 8/2005 | Galeazzi |
| 2013/0256191 A1 | 10/2013 | Zimmerman et al. |
| 2016/0281009 A1 | 9/2016 | Aubry et al. |
| 2018/0320093 A1 | 11/2018 | Aubry et al. |

FOREIGN PATENT DOCUMENTS

| | | |
|---|---|---|
| EP | 0794241 A2 | 9/1997 |
| GB | 1220701 A | 1/1971 |
| JP | 2005-509728 A | 4/2005 |
| JP | 2016-503821 A | 2/2016 |
| JP | 2016-522846 A | 8/2016 |
| RU | 2174534 C2 | 10/2001 |
| RU | 2612531 C2 | 3/2017 |

OTHER PUBLICATIONS

Finnish Search Report dated Jun. 28, 2018, issued by the Finnish Patent Office in the corresponding Finnish Patent Application No. 20185316. (2 pages).

The extended European Search Report dated Jul. 30, 2019, by the European Patent Office in corresponding European Application No. 19166991.0. (7 pages).

Office Action dated Aug. 6, 2019, by the Japanese Patent Office in corresponding Japanese Patent Application No. 2019-073099, and a partial English Translation of the Office Action. (19 pages).

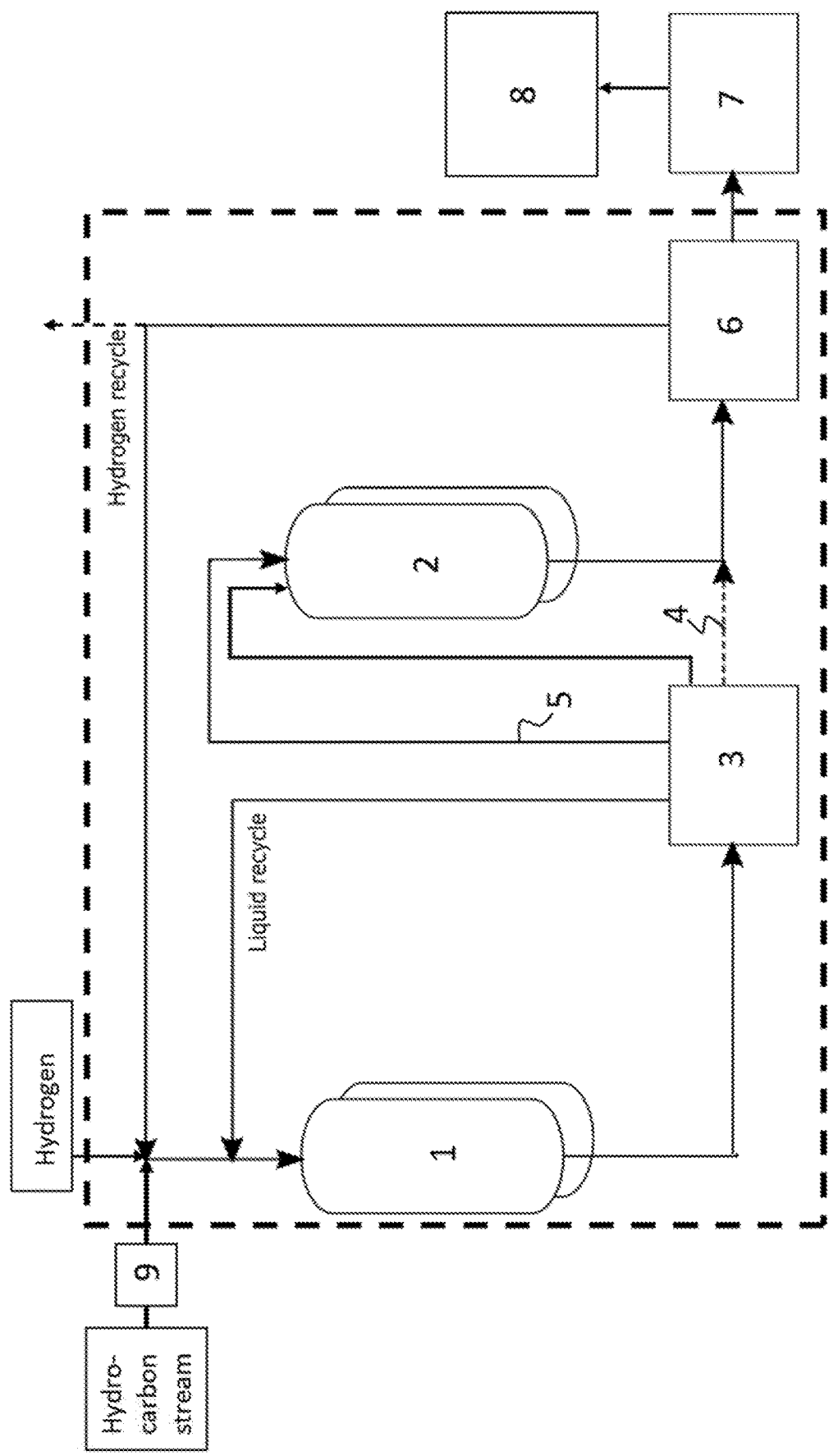

PROCESS AND APPARATUS FOR HYDROGENATION

FIELD OF THE INVENTION

The present invention relates to a hydrogenation process of different fractions in oil refining. It also relates to a process device applicable thereto and use of said device for hydrogenation of various feeds. Further, herein is provided a method relating to arrangements during campaign changes.

BACKGROUND OF THE INVENTION

Hydrogenation processes are a basic component of process variety for petrochemical refinery. Typically, a refinery comprises several process lines and series of units optimized for certain feeds and processes accordingly, wherein hydrogenation processes with special settings serve needs and conditions specific for each site.

A feature common to most prior art hydrogenation processes is that they are applicable only to the specific feedstock for which they have been designed and optimized. Thus, the catalyst and the operating conditions employed will differ so that a dearomatisation process developed for hydrogenation of, say, heavy middle distillates cannot be used for converting light naphtha. Nor can a saturation process of light hydrocarbons be used for dearomatisation of middle distillates.

Furthermore, hydrogenation processes developed for pure feed components, as for example for hydrogenation process of benzene or toluene as such, cannot be used for processing distillate fractions containing mixtures of aromatic hydrocarbons. This is partly because the reactivity of different aromatic hydrocarbons varies. To take mesitylene as an example of a substituted benzene compound contained in an aromatic feedstock, hydrogenation of 50% of that compound will require more than 2 times the reaction time needed for hydrogenation of benzene. This means in practice that, under the reaction conditions suitable for complete hydrogenation of benzene, considerable amounts of the heavier aromatic compounds will remain unsaturated.

As a result of the above, at a modern refinery producing a large variety of hydrocarbon streams or distillates to be used as light and heavy fuels and solvents as well as raw material for petrochemicals and plastics, there must be a number of different hydrogenation units. It has been general understanding that if one unit was designed for flexible hydrogenation of different feeds, it would inevitably lead to trade-offs with regard to conversion, catalyst, energy and raw material consumption, product quality and so forth. Publication U.S. Pat. No. 9,732,286 B2 provides a two-stage process for dearomatisation of somewhat different feeds. In the first hydrogenation at certain temperature, pressure and flow rate, a partially-hydrogenated hydrocarbon feedstock is produced. It is next subjected to second hydrogenation wherein in addition to certain temperature, pressure and flow rate there is defined a ratio between the superficial mass flow rate of the liquid partially-hydrogenated feedstock and the superficial mass flow rate of gas (Ul/Ug) at the inlet of the reactor. They present it possible to obtain a hydrocarbon feedstock from this second hydrogenation stage that complies with the specifications, hence, with aromatic content of less than 20 ppm by weight.

However, market needs and feedstock availability urges for higher flexibility for processing different feedstocks. As a result, there is still a need to provide a device and process with which saturation of C4-C6 olefins is possible in the same reactor as dearomatisation. Accordingly, there is a need to save investment costs through multipurpose device, which can be used in campaign mode for different reactions and conversion of different feeds. There is a further need for improving the process economy through savings in energy consumption during campaigns and campaign changes within the hydrogenation device. In addition, there is an additional need for increasingly effective use of hydrogen gas in the process, especially for prevention of losses during campaign changes.

SUMMARY OF THE INVENTION

To overcome at least some of the problems of the prior art technology, herein is provided a novel process for hydrogenation, an embodiment for campaign change and a device for implementation thereof. Underlying idea behind this processes and device is a design, with which, the pressure is maintained essentially constant in the high-pressure section of the process and device.

Herein is thus provided a process for hydrogenation of a hydrocarbon stream comprising olefinic compounds, aromatic compounds or a combination thereof, comprising the steps defined in the independent claim 1.

The present inventors have found that by keeping the pressure essentially constant within the high-pressure section, the same process can be used for hydrogenation of very different feeds. Within the present device and process features contributing to the constant pressure comprise the high-pressure separation of the outlet stream from the first hydrogenation reaction zone, conducting the separated first intermediate gas stream to the second reaction zone and dividing the first intermediate liquid stream partly as the liquid recycle back to the first reaction zone and partly to either to the second reaction zone or to a liquid bypass. Hereby, flexibility needed with regard to varying campaign feeds is provided in a way decreasing depressurisation. Further, avoidance of pressure losses reduces both energy and hydrogen consumption. Especially interesting is the arrangement, wherein the gas stream from the outlet of first hydrogenation reaction zone is always conducted through the second hydrogenation reaction zone, and flexibility can be provided by directing a portion of the liquid stream either to said second hydrogenation zone or through the liquid bypass. This arrangement contributes to flexibility with regard to different feeds and hydrogenation needs thereof. During hydrogenation, said second hydrogenation zone provides improved total conversion. Additionally, the catalyst activity in the second reaction zone reactor(s) is increased when being rinsed with hydrogen when liquid bypass is in use. The first intermediate liquid stream bypassing the second reaction zone contributes to enhancing and maintaining catalyst activity in the second reaction zone, still providing a saturated product exiting the high-pressure section of the process.

The benefits obtained through the suitability of the present hydrogenation process for different feeds provides advantages where the unit is used for flexible production and sequential campaigns are run, with differing feeds and products thereof. In such use, the unit down-time, and losses in both utilities and hydrocarbons should be minimized.

As a second aspect of the present invention is thus provided a process for a change from one campaign to a next campaign within the present process for hydrogenation. Accordingly, this embodiment the process further comprises steps keeping the pressure essentially constant within the high-pressure section;
flushing the catalysts in first and second hydrogenation zones with hydrogen; and
draining liquids from the unit;
for a change from one campaign with a hydrocarbon stream as a feed to a next campaign with another hydrocarbon stream as a feed.

Further, losses with hydrogen gas can be controlled and decreased since the unit construction enables the maintenance of high hydrogen pressure during campaign changes whereby there is no need to shut down the unit completely. Further, since each shut down strains the process equipment, the present process provides additional advantages through smoother campaign changes. It is also noteworthy, that human mistakes related to discontinuous events can thereby be decreased leading to improved security and savings. As a consequence of shortened campaign change times, off-quality product losses can also be decreased.

As a third aspect, herein is provided a device for implementing the present hydrogenation process comprising a first hydrogenation reaction zone with at least one hydrogenation reactor, a second hydrogenation reaction zone with at least one hydrogenation reactor, a liquid recycle loop from a hot high-pressure separator to the inlet of the first reaction zone, means for conducting the first intermediate gas stream from said hot high-pressure separator to the second reaction zone, means for conducting at least part of the first intermediate liquid stream to the second reaction zone, a line for liquid bypassing the second reaction zone, a cold high-pressure separator and a gas recycle loop from the cold high-pressure separator to the inlet of the first reaction zone. Advantages mentioned above in relation to hydrogenation process and method for campaign change apply to the device as well.

Unexpectedly, the design of the present device for hydrogenation has shown to be effective in processing with the present process feeds previously believed to require a specific unit of their own, a specific process equipment and inflexible process settings. Such feeds comprise in general any hydrocarbon stream, wherein double bonds (—C=C—) present in one or several components therein should be saturated with hydrogenation. Typical components to be saturated are olefins and aromatics. Especially surprising was the finding that the present hydrogenation device deeply hydrogenates both aromatic-rich and olefin-rich feeds. Different feed hydrocarbon streams are hydrogenated on the same catalyst in the same hydrogenation device. Such method provides considerable investment savings in a unit, where there is a need to process different feeds in relatively short campaigns. Need to construct an individual line for each feed can be avoided and one line for the present method for hydrogenation effectively used for different campaigns. Different hydrocarbon streams can be used as feeds in the same hydrogenation unit producing a wide range of final products, thereby meeting market needs, reacting to availability of different feedstocks, and hence improving overall profitability of the unit. The flexibility and advantages gained thereby are in part based on novel embodiment for campaign changes, whereby the line needs not be reconstructed when ending one campaign and starting another.

Short campaign change times can be achieved using liquid recycle loop, alteration of reactor temperature measurements and flushing the catalyst with hydrogen. The present inventors have provided a process for campaign changes wherein the feed can be changed without shutting the unit down completely and thus campaign change time and unit down-time can both be reduced. The inventors found that with this arrangement, considerably different feeds can successfully be hydrogenated in campaigns, wherein the campaign changes can be conducted maintaining the operating pressure, and thereby with decreased energy consumption. The present process for campaign changes provides savings in hydrogen consumption as well.

BRIEF DESCRIPTION OF THE DRAWINGS

The invention will be described in greater detail by means of preferred embodiments. Reference to the attached accompanying drawing is also made, in which FIG. 1 shows a schematic arrangement for hydrogenation according to present process and device. Input hydrocarbon stream feed and hydrogen, as well as recycle loops are given with wording and with reference numbers identifying the most relevant pieces of equipment and two essential lines.

DETAILED DESCRIPTION OF THE INVENTION

With reference to device, apparatus or unit, it is herein referred to the process equipment that is arranged to provide the entity, wherein hydrogenation processes and the campaign change process according to the present invention can be run. The unit or device comprises reactors, heat exchangers, separators, compressors, pumps, valves, controls and necessary piping to set up the system. Typically, a unit has an inlet providing the feed, the main stream, recycle loops, and outlet leading to further unit(s) and providing products.

As used herein, dearomatisation of hydrocarbon streams or distillates denotes saturation reactions reducing double bonds of aromatic compounds to cycloparaffins. In dearomatisation, hydrogen gas is typically provided in excess in the presence of a catalyst. The typical aromatic compounds to be saturated comprise benzene, toluene, tetramethylbenzene, diethyl methylbenzene, pentylbenzene, and indene. Possible polyaromatic hydrocarbons comprise naphthalene and derivatives thereof, and anthracene and phenanthrene and derivatives thereof.

Many petroleum cuts or distillate fractions contain aromatic compounds which are harmful for the human health. Hence, dearomatisation is one of the most typical hydrogenation reactions needed in petrochemistry. In order to provide non- or low-aromatic hydrocarbon products, a number of dearomatisation processes have been developed. Principally, they are based on conversion of the aromatic compounds to the corresponding saturated hydrocarbons by reacting said aromatic compounds with hydrogen in the presence of a suitable catalyst at elevated pressure and temperature. After dearomatisation, the hydrogenated products are usually stabilized by removal of the light, volatile hydrocarbon components.

In typical applications, the definitions "non- or low-aromatic hydrocarbon products" refer to products wherein the aromatic content is 5%-vol at maximum, in some applications preferably less than 0.5%-vol.

Here, the term "olefin saturation" is used to refer to saturation reactions reducing carbon-carbon double bonds of olefinic compounds to produce paraffins. Olefins are also known as alkenes. By definition, they are compounds made up of hydrogen and carbon which contain one or more pairs of carbon atoms linked by a double bond. With hydrogenation, said double bonds (—C=C—) are saturated to single bonds (—C—C—).

When saturated, cyclic olefins produce cycloparaffins. Saturation of acyclic olefins provides n-paraffins when the carbon chain is straight and i-paraffins, should the carbon chain be branched.

With hydrogenation is herein in general referred to a process comprising the steps of feeding a hydrocarbon stream into a hydrogenation unit, contacting said hydrocarbon stream with hydrogen in the presence of a catalyst in order to hydrogenate the aromatic and/or olefinic compounds contained therein to produce a saturated product, and recovering the saturated product from the high-pressure section of the hydrogenation process unit. In general, the theoretical aim is to saturate all double bonds present and hence complete conversion. However, a man skilled in the art is well aware that in practice, it is sufficient that at least part of the aromatic and olefinic compounds is hydrogenated, referring here to conversion between 60 and 99.99% of aromatic and/or olefinic compounds in the hydrocarbon stream. It is also known that the conversion is dependent on the process settings and conditions, and hence, hydrogenation as used herein refers to sufficient conversion.

Conversion aim is also dependent on the hydrogenation process choices. In the present case, when the process is conducted through both first and second zones, the conversion within the first zone may be from 60 to 99%, whereby at least a part of the aromatic and olefinic compounds is hydrogenated. The remaining aromatic and/or olefinic compounds are further hydrogenated in the second hydrogenation zone leading to the desired overall conversion, such as from 90 to 99.99%.

In the following description, the hydrogenation reactors involved are defined as "the first reaction zone" and "the second reaction zone". Basically, according to an embodiment, the first reaction zone consists of one reactor and the second reaction zone of one reactor correspondingly. However, either the first or the second reaction zone may consist of two or more reactors, referred to as front reactor and following reactor(s), typically arranged in series, wherein the order of reactors may be changed. Preferably the first reaction zone comprises two reactors. Alternatively, said reactors may be arranged parallel. With two or more reactors within first and/or second hydrogenation zone, substitutes may be provided. Hence one reactor may be in use while another within the same zone is offline during maintenance or regeneration.

The hydrogenation reactions take place in fixed bed reactors filled with a hydrogenation catalyst. Temperature increase caused by the exothermic hydrogenation reactions is controlled by recycling part of the first reaction zone liquid effluent, here referred to as "first intermediate liquid stream", to the first reaction zone inlet. The recycle loop goes through the first reaction zone, in which the major part of the hydrogenation/saturation reactions takes place. The reactor(s) in the second reaction zone outside the cooling loop comprise a hydrogenation catalyst as well and contribute to ensuring the desired product specifications.

The difference between said first and second reaction zones is that cooling and liquid recycle loop is arranged only for the first reaction zone. The main part of the exothermic hydrogenation reactions take place in the first reaction zone, and therefore dilution and cooling provided by the recycle loop are needed. The second reaction zone on the other hand, contribute to driving the hydrogenation conversion even further, with reactions producing less heat. Hence, there are no means for temperature control arranged within the second reaction zone.

The liquid recycle loop provides cooled first intermediate liquid stream from the hot high-pressure separator to the first reaction zone inlet to restrict the temperature rise in the first reaction zone to less than 60° C.

The temperature rise across the first hydrogenation reaction zone is controlled by liquid recycle loop in which cooled first intermediate liquid stream is recycled from the hot high-pressure separator to the first reaction zone inlet. Liquid recycle rate is typically from 0.5 to 15 times the fresh feed rate. Said recycle provides control both by providing cooled liquid and by diluting the feed, thereby restricting the reaction rate and temperature increase at the hydrogenation.

By arranging the cooling with recycling a part of the first intermediate liquid stream, separated from the outlet of the first reaction zone as a liquid recycle stream back to the inlet of said first reaction zone, the process can be kept effective and the scale optimized.

The reactors referred to herein can be defined as hydrogenation reactors. A man skilled in the art knows different reactor designs and applicability to different reactions. In case there are more than one reactor in the first reaction zone or second reaction zone, having reactors essentially similar to one another within one zone provides benefits through process controls.

The hydrogenation reaction applied herein is catalytic hydrogenation. Hence, the first and second reaction zones comprise one or more catalytic beds. Preferably the reactors in the first and second reaction zones are trickle bed reactors. These have shown to be especially advantageous under present conditions, where pressure is kept constant. They also contribute to the objects of overall energy efficiency.

A number of hydrogenation catalysts is known in the art. Said catalysts may be provided on a support, typical supports comprise high melting oxides. Known hydrogenation catalysts for petrochemistry typically comprise a metal selected from platinum, iron or nickel. Of these, nickel has been shown to provide the desired performance and has been used in the present experiments.

For hydrogenation reactions in both first and second hydrogenation zone, hydrogen is provided in excess, typically from two-fold to ten-fold excess. Hydrogen feed may comprise make-up hydrogen and recycle hydrogen. Make-up hydrogen, which can also be referred to as fresh hydrogen, is supplied from a dedicated hydrogen generation unit. Recycle hydrogen is obtained from cold high-pressure separator after the second reaction zone.

Hydrogenation Process

Different feedstocks are hydrogenated in the same hydrogenation unit. Hence, herein is provided a process for hydrogenation of a hydrocarbon stream comprising olefinic compounds, aromatic compounds or a combination thereof, which process comprises the steps of i) feeding the hydrocarbon stream and hydrogen into a first reaction zone of a hydrogenation process unit, ii) hydrogenating in the first reaction zone in the presence of a catalyst at least part of said aromatic compounds, olefinic compounds or both compounds to produce a first intermediate, iii) cooling and separating said first intermediate into liquid stream and gas stream, iv) conducting the first intermediate gas stream to a second reaction zone of the hydrogenation process unit v) conducting said first intermediate liquid stream to
   a) the inlet of the first reaction zone as a liquid recycle stream in order to restrict the temperature rise in the first reaction zone to less than 60° C., and to b) a second reaction zone, wherein the remaining aromatic compounds, olefinic compounds or combination thereof contained in said first intermediate liquid stream are hydrogenated with the first intermediate gas stream in the presence of a catalyst to produce a saturated product, or c) a liquid bypass line, which bypasses the second reaction zone, wherein said first intermediate liquid stream comprises a saturated product, vi) separating said saturated product into liquid product stream and a gas recycle stream, vii) recovering the liquid product stream from the hydrogenation process unit;

wherein said steps from i) to vii) are conducted at a constant pressure selected from 2-8 MPa.

The pressure within steps from i) to vii), i.e. within the high-pressure section of the hydrogenation process, is maintained essentially constant at a pressure selected from 2-8 MPa. Hence, once the pressure is set in the cold high-pressure separator, the same pressure is set for the reactors, heat exchangers, separators, recycles and a bypass. Only after the liquid product is recovered from the separator, is the pressure dropped at the stabilisation. The set pressure is a constant pressure selected between 2 and 8 MPa, preferably between 3-6 MPa. Said constant pressure is maintained even through the campaign changes.

According to preferred process conditions, the hydrocarbon stream is contacted with hydrogen at an amount of 25 to 500 Nm³ hydrogen/m³ hydrocarbons of the feedstock, at a temperature from 50 to 270° C., and at a LHSV from 0.2 to 10 1/h. Among these standard process controls LHSV refers to volumetric liquid hourly space velocity indicating the reactant liquid flow rate/reactor volume.

The hydrogenated stream from the outlet of said first reaction zone is herein referred to as the first intermediate. Said first intermediate is separated into a first intermediate gas stream and a first intermediate liquid stream. Said separation of first intermediate is conducted by means of a hot high-pressure separator.

In cases where the conversion after the first reaction zone is satisfactory, said first intermediate liquid stream is divided between liquid recycle loop and liquid bypass line. Because there is no need for further hydrogenation, the conduct through said liquid bypass line transfers said first intermediate liquid stream into saturated product in terms of the present description. Hence, in the liquid bypass line, the first intermediate liquid stream comprises a saturated product. Due to the process design, the gas stream from the outlet of the second reaction zone is combined with said saturated product and led to cold high-pressure separator.

In case the option of reacting said first intermediate liquid stream in the second reaction zone is applied, the unsaturated hydrocarbons remaining after the first reaction zone are then reacted with hydrogen-rich first intermediate gas stream and thereby saturated product obtained. Said saturated product together with gases are led from the outlet of the second reaction zone to the cold high-pressure separator.

Separation to liquid and gas or vapor stream in step vi) yields the saturated product as liquid and separated gas stream. According to a preferred embodiment, the separated gas stream from step vi) is conducted as hydrogen recycle stream to the inlet of the first reaction zone. This allows the use of excess hydrogen and effective use thereof. Said separated gas stream may in other embodiments be lead to other processes consuming hydrogen outside the hydrogenation unit.

The present inventors have found advantages of the present process being related to the constant pressure maintained through the hydrogenation processes within the high-pressure section of the hydrogenation unit. As used herein, the high-pressure section includes reactors, separators and recycle gas compressors. In practice, in process design a pressure between 2 and 8 MPa is selected and set, and thereafter the process is conducted at this set pressure regardless the hydrocarbon stream as feedstock and product of choice. Therefore, it is beneficial to use equipment contributing to constant pressure and avoiding pressure losses. It was a surprising finding that different feedstocks may be hydrogenated to fulfil different quality demands applying one process and within one device at one selected pressure.

Accordingly, the process comprises at least one high-pressure separator. Preferably one hot high-pressure separator is situated downstream from the first hydrogenation reaction zone and separates the cooled intermediate into gas stream to be led to the second reaction zone and liquid stream. The hot high-pressure separators and cold high-pressure separators are commercially available and often referred to as HHPS and CHPS respectively.

When used as feeds for the present process, hydrocarbon streams comprise olefinic compounds less than 70 wt-%, preferably less than 50 wt-%, more preferably less than 30 wt-% of the total feed mass. Such feeds have been considered too light to be fed to a process capable of heavier hydrocarbon stream hydrogenation.

According to an embodiment, the feed comprises aromatic compounds less than 70 wt-%, preferably less than 50 wt-% and most preferably less than 30 wt-% of the total feed mass.

Furthermore, very different feeds have been found being hydrogenated with the present method. Contrarily to expectations, possible feedstocks and processes for the present hydrogenation process and device are light naphtha, full range naphtha and middle distillates comprising aromatics, olefins or both.

When used as a feed hydrocarbon stream in the present hydrogenation unit, light naphtha (feed A) through hydrogenation or saturation of olefins produces highly saturated C4, C5, C6 hydrocarbons with low olefins content. In the same unit, full range naphtha (feed B) may be used as the feed. In case of full range naphtha as a feed hydrocarbon stream, the present hydrogenation provides through dearomatisation of benzene and other aromatics, benzene-free C5, C6, C7 hydrocarbons. In case of middle distillates, gasoil or light gasoil as the feed (feed C) the hydrogenation is again dearomatisation of benzene, other aromatics and heavier polyaromatics, from which low aromatic solvents are produced.

The present inventors have now shown that feeds generally considered too different to be processable in the same hydrogenation unit can be run in subsequent campaigns. Without being bound to order of said feeds, at least two feedstocks can be fed sequentially to the present hydrogenation process.

Said feedstocks may differ from one another as to distillation range, hydrocarbon chain length given as carbon number range, and aromatic and olefinic compound content. Hence, the hydrocarbon stream comprising olefinic compounds, aromatic compounds or a combination thereof fed to the process can be defined as a hydrocarbon fraction wherein 90%-wt of the hydrocarbons a. have a distillation range defined by an initial boiling point from −10 to 230° C., and a final boiling point up to 330° C. according to standard ASTM D-86, and b. have a carbon number range wherein the difference between the lower carbon number limit and higher carbon number limit is from 0 to 5, preferably from 0 to 3 and said carbon number range is a subrange of carbon numbers from C4 to C17.

The hydrocarbon stream used as feed to hydrogenation is typically a hydrocarbon cut obtained from fractionation of fossil or renewable feedstock. Fractionation yields cuts, wherein 90%-wt of the hydrocarbons have such carbon numbers that the difference between the lowest carbon number and the highest carbon number is 5 or less, thus their carbon chain lengths are close to one another. Hence, if the lowest carbon number of said subrange was C6, the range following this definition could be C6-C11, C6-C10, C6-C9, C6-C8, C6-C7 or C6. If the difference was limited to from 0 to 3, the subranges with the same lower carbon number limit could be hydrocarbons having carbon numbers C6-C9, C6-C8, C6-C7 or C6.

Examples of said hydrocarbon stream as feedstock comprise:

A) a hydrocarbon stream wherein at least 90% of the hydrocarbons are C4-C6 hydrocarbons, and have a distillation range defined by an initial boiling point of −10° C., and final boiling point not exceeding 80° C. according to standard ASTM D-86, B) a hydrocarbon stream wherein at least 90% of the hydrocarbons are C5-C8 hydrocarbons, and have a distillation range defined by an initial boiling point of 57° C., and final boiling point not exceeding 140° C. according to standard ASTM D-86, and C) a hydrocarbon stream wherein at least 90% of the hydrocarbons are C11-C16 hydrocarbons, and have a distillation range defined by an initial boiling point of 230° C., and final boiling point not exceeding 330° C. according to standard ASTM D-86.

To the present inventors, it was surprising to note that the present process is operable and provides desired results with feed A as defined above, which is relatively light hydrocarbon olefinic stream, with the same device and under same constant pressure as for heavier aromatic containing feeds, such as B or C.

According to an embodiment, the hydrocarbon streams as feeds are obtainable from fossil sources. Petroleum cuts, i.e. hydrocarbon streams originating from fossil sources, typically crude oil or shale oil, may comprise high proportions, even up to 90 wt-% of the total weight of aromatic compounds, which for most applications need to be removed or converted into paraffins. Cuts originating from fossil sources may contain olefins as well, especially when coming from petroleum cracking processes upstream, such as Fluid Catalytic Cracking (FCC).

A range of hydrocarbon stream applicable as feeds originating from renewable sources are available. Abundant carbon sources, such as lignocellulosic biomass, cellulose, hemicellulose, starch, sugars, fats, oils provide renewable hydrocarbon streams through different treatments and refining. Hydrocarbon streams may also be produced by microorganisms, such as algae, bacteria and fungi followed by appropriate refining. Depending on the source and nature of the hydrocarbon precursors, the hydrocarbon streams obtainable may comprise olefinic or aromatic compounds or combinations thereof.

An example feedstock for the renewable hydrocarbon stream may originate from plant oils or fats, or animal oils or fats, or fish oils or fats. Hydrocarbon streams may be derived with known technologies from: any kind of plant fats, plant oils, and plant waxes; any kind of animal fats, animal oils, animal waxes, animal-based fats, fish fats, fish oils, and fish waxes; fatty acids or free fatty acids obtained from plant fats, plant oils, plant waxes; animal fats, animal oils, animal waxes; fish fats, fish oils, fish waxes, and mixtures thereof by hydrolysis, transesterification or pyrolysis; fats contained in milk; metal salts of fatty acids obtained from plant fats, plant oils, plant waxes; animal fats, animal waxes; fish fats, fish oils, fish waxes, and mixtures thereof by saponification; anhydrides of fatty acids from plant fats, plant oils, plant waxes; animal fats, animal waxes; fish fats, fish oils, fish waxes, and mixtures thereof; esters obtained by esterification of free fatty acids of plant, animal and fish origin with alcohols; fatty alcohols or aldehydes obtained as reduction products of fatty acids from plant fats, plant oils, plant waxes; animal fats, animal waxes; fish fats, fish oils, fish waxes, and mixtures thereof; recycled fats of the food industry; fats contained in plants bred by means of gene manipulation or genetic engineering; dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds, or compounds derived from algae, molds, yeasts, fungi and/or other microorganisms capable of producing compounds mentioned above or compounds similar to those.

When the hydrocarbon stream as feedstock for the present process is derived from fatty-acid rich renewable sources, the aromatic content is often intrinsically low. For example, renewable feed obtained from fatty acids or mono-, di- or triglycerides thereof by hydrodeoxygenation and optionally isomerisation, are substantially free from aromatics and easily go below 1 wt-% due to nature of the raw material. However, such feedstocks from renewable sources often contain olefinic unsaturated hydrocarbons.

The feed may also be a blend of hydrocarbon streams from fossil and renewable sources or a hydrocarbon stream obtained from processing such a blend. The feedstocks are hence obtainable from fossil sources, renewable sources or any combination thereof.

Different feeds require somewhat different temperatures in hydrogenation processes. However, the pressure may be kept substantially constant. Due to the high pressure level maintained in the system, there is no need for optimising the gas recycle.

According to an embodiment, the hydrogenated liquid product stream obtained from the high-pressure section of the hydrogenation unit is further fractionated into products of defined boiling ranges. The liquid product stream is stabilized in a stabilizer column, optionally distilled to be divided into fractions, and sent to the storage. The fractionation step is carried out outside the high-pressure section and at a pressure from 1 kPa to 1 MPa absolute.

Items which are left for the man skilled in the art to optimise are catalyst volume, reaction temperatures and recycle gas rate, hydrogen/feed ratio etc.

An Embodiment for Campaign Change

When the present hydrogenation device is used for hydrogenation of a feed, it has been found that feeds typically requiring very different hydrogenation conditions and process equipment may be processed with the same unit. It is especially interesting, that dearomatisation and saturation of olefins, can successfully be conducted in the same hydrogenation device. However, a specific advantage obtainable through the present process and device is a novel process for campaign change. Compared to processes known from the prior art, the present hydrogenation device provides means for running very different feeds for remarkably different hydrogenation reactions, wherein the change from one feed to another provides improvements as to downtime and product and reactant losses during campaign change are concerned. Smooth change from one feed to another is essential to minimize down-time and product mixing.

Traditionally, process chemistry uses terms batch process and continuous process. Continuous processes are typically run as long a period as possible, only stopped for maintenance and started again with the same feed, conditions and products. With the term "campaign" is here referred to a continuous process, which is run for a period of time. The present process can be set up and run using one feed for a period, and then, through the method for campaign change, run using another feed for another period. In this context, the campaign length may vary between 1 and 30 weeks, typically between 2 and 20 weeks. The benefits of the present method for campaign change are best noticed when the campaigns are relatively short (for example from 2 to 6 weeks), and changes consequently frequent. However, for overall productivity a balance between campaign changes and lengths is dependent on several factors. Anyway, the present method for campaign change provides benefits over traditional changes involving a complete shut-down of the unit.

According to an embodiment, the present hydrogenation process further comprises steps for a change from one campaign with a hydrocarbon stream as a feed to a next campaign with another hydrocarbon stream as a feed;
keeping the pressure essentially constant within the high-pressure section;
flushing the catalysts in first and second hydrogenation zones with hydrogen; and
draining liquids from the unit.

More specifically, a detailed example of the process for campaign change comprises the following steps in the order herein given, which however may be partly overlapping. Hence, within a hydrogenation unit comprising first and second hydrogenation zones, heat exchangers, high-pressure separators, a stabilizer, liquid recycle and hydrogen recycle, a method for a change from one campaign to a next campaign comprises the steps of
a. draining liquids from the hydrogenation zones;
b. keeping the pressure essentially constant and monitoring the temperatures in the reactors;
c. starting a liquid recycle from the stabilizer bottom to the inlet of the first reaction zone;
d. cutting off the feed to the first reaction zone;
e. stopping the liquid recycle at a time point where the reactor temperature measurements show essentially constant temperatures;
f. flushing the catalysts with hydrogen;
g. draining liquids from the unit;
h. setting temperatures to the values required for the next campaign;
i. filling the stabilizer column and the feed drum with next feed;
j. pumping preheated next feed to the first reaction zone to start the next campaign.

Recycle is established from the product cooler to the feed drum and the fresh feed to the unit can be stopped.

Liquid recycle shall be continued at normal operating pressure and the operating temperature prevailing just before starting the recycle as long as any temperature profile is observed in the reactors. Temperature in the hot high-pressure separator shall however be reduced.

The hydrogen flushing shall be done with once through hydrogen. Alternatively recycle gas compressor can be used. Anyway, hydrogen flowrate should be maximized. Gas purge shall be sent through control(s) and separator(s) to a flare.

Hydrocarbons flushed from the reactors are collected in the hot high-pressure separator and cold high-pressure separator. So, it is important to minimize levels in the high-pressure separators before starting the hydrogen flushing. It is also important that the air coolers are in operation with adequate duty (louvers open) to cool the inlet stream to the high-pressure separators to 40° C. or below to condense hydrocarbons as well as possible.

During hydrogen flushing, operating pressure in the cold high-pressure separator can be reduced. In general, flushing temperature should be same as the operating temperature for the earlier feed.

Through this process, advantages can be achieved. Firstly, through careful draining of the liquid from the system, mixing of different campaigns can be successfully avoided. The hydrogen flushing effectively removes hydrocarbons from the system. However, conversely to prior understanding, it also provides advantages to catalysts through flushing off remains of the campaign feed, intermediates and products, which purifies the catalysts for the next campaign. This is especially beneficial considering the heaviest aromatic compounds, which otherwise could accumulate to the recycle or contaminate the catalyst. An important feature of the process for campaign changes is the arrangement with which the liquid hydrocarbons are drained from the unit while hydrogen recycle is maintained in operation. Further, since the hydrogen pressure is maintained, the hydrogenation device is kept running and the start of the next campaign is quicker once feed is introduced to the feed drum. Thereby, pressure losses are decreased contributing to the overall economics of campaign changes.

The present hydrogenation unit comprises a hydrogenation device. A man skilled in the art understands that the hydrogenation unit is connected to other unit processes upstream and downstream. Roughly, the device comprises feed tanks, hydrogenation reactors, separators, recycle lines, heat exchangers, and is connected to product stabilisation through distillation.

A device for implementing the present process comprises a first hydrogenation reaction zone with at least one hydrogenation reactor, a second hydrogenation reaction zone with at least one hydrogenation reactor, a liquid recycle loop from a hot high-pressure separator to the inlet of the first reaction zone, means for conducting the first intermediate gas stream from said hot high-pressure separator to the second reaction zone, means for conducting at least part of the first intermediate liquid stream to the second reaction zone, a line for liquid bypassing the second reaction zone, a cold high-pressure separator and a gas recycle loop from the cold high-pressure separator to the inlet of the first reaction zone.

With reference to FIG. 1, the present process and device for hydrogenation may be described comprising at least one reactor within the first hydrogenation reaction zone 1. The hydrocarbon stream as feed is conducted to the first hydrogenation reaction zone 1 through the feed drum 9. A hot high-pressure separator 3 separates the cooled first intermediate from the said first hydrogenation reaction zone to provide a first intermediate liquid stream and a first intermediate gas stream 5. A part of the first intermediate liquid stream is directed as liquid recycle back to the first hydrogenation reaction zone reactor(s). The rest of the first intermediate liquid stream is conducted either to the second hydrogenation zone 2 downstream from said separator 3 for further hydrogenation or to a liquid stream bypass line 4 arranged to bypass the second hydrogenation zone 2. Optionally both can be applied. From the hot high-pressure separator 3, the gas stream is arranged to be directed to the second hydrogenation zone 2. From the outlet of the second hydrogenation zone, a saturated product and gas are cooled and directed to cold high-pressure separator 6 from which the liquid product stream is led to product stabilisation section 7 and fractionation 8. The gas stream from said cold high-pressure separator 6 is conducted as hydrogen recycle back to the first hydrogenation reaction zone and combined with make-up hydrogen to be fed back to the process. Alternatively, the gas stream from said cold high-pressure separator 6 is conducted out of the high-pressure section (dashed line upwards from 6) of the hydrogenation unit.

The hydrogenation process and device further comprise heat exchangers, compressors, and further standard process equipment not specifically described in the FIGURE.

The hydrocarbon stream as feedstock is conducted to the first hydrogenation reaction zone 1 through the feed drum 9, after which the feed is pressurized to the set reaction pressure. The hydrocarbon stream is preheated (not shown) utilising the heat formed in exothermic reactions and collected from cooling down of the outlet stream of the first hydrogenation reaction zone. The hydrocarbon stream feed is combined with recycle hydrogen and make-up hydrogen and further heated up (not shown) to the desired feed temperature.

Still in reference to FIG. 1, according to an embodiment the process configuration used for hydrogenation of the hydrocarbon stream comprises at least one hydrogenation reactor in the first reaction zone 1 and at least one hydrogenation reactor in the second reaction zone 2 for optionally completing the conversion.

Since the process and device are especially suitable for flexible hydrogenation of different feedstocks, several options for running the process are available. In cases where the requirements for conversion are high, the first intermediate liquid stream obtained from the hot high-pressure separator is fed to the second hydrogenation zone 2. Even though the need for saturation is relatively small due to the majority of hydrogenation taking place in the first reaction zone, the unsaturated olefins, aromatic compounds or a combination thereof remaining in said first intermediate liquid stream are hydrogenated in the second hydrogenation zone with high conversion.

In cases where the conversion obtained in the first reaction zone is sufficient, there is no need to lead the first intermediate liquid stream to the second reaction zone. In this case, only the gas stream passes through the second reaction zone. The present inventors have found this being advantageous both by allowing maintenance of the constant pressure on the high-pressure section with different feeds and product requirements, and by flushing the catalyst in the second reaction zone and thereby purifying the catalyst. Whether to conduct the first intermediate liquid stream to the second reaction zone is controlled by use of bypass line 4.

The second reaction zone 2 is operated when required for desired product specifications. Such cases may apply to feedstocks containing olefinic or aromatic compounds or combinations thereof, which are not hydrogenated to the required level in the first reaction zone. Other cases may be related to need to comply with such product specifications which are not met with hydrogenation in the first reaction zone only. Hydrogen-rich gas is separated from the liquid effluent in a cold high-pressure separator 6 and recycled to the first reaction zone 1 inlet or conducted out of the high-pressure section (dashed line upwards from 6) of the hydrogenation unit.

It is essential that, the first intermediate gas stream 5 from the separator 3 is always guided through second hydrogenation zone. From the second reaction zone 2, the outlet stream is fed to the cold high-pressure separator 6 wherefrom the saturated product to the stabilisation section 7. There is no recycle of the liquid stream from cold high-pressure separator 6 to any reactor. Said stabilisation section 7 (details not shown) is maintained under process conditions sufficient to produce products substantially free of hydrogen and light hydrocarbons. The stabilized product may be fractionated in distillation column 8 into fluids of defined boiling ranges.

In FIG. 1, a dashed line square denotes the high-pressure section of the present process and device within the hydrogenation unit. The equipment within said dashed square are set to a constant pressure selected between 2 and 8 MPa. It is clear to a man skilled in the art that, a set constant pressure in practice shows an insignificant pressure profile, typically around a couple of bars showing slightly higher pressure at the inlet for the first reaction zone, and decreasing towards the cold high-pressure separator. However, the present inventors have found the substantially constant pressure within the high-pressure section of the present process and device providing advantages through energy efficiency, low hydrogen consumption and decreased process down-time.

According to a preferred embodiment a device and process for hydrogenation comprises two reactors in the first reaction zone, herein referred to as front reactor and following reactor. This embodiment is studied in detail in the examples 1 and 2 of this disclosure. In the examples, the process configuration used for hydrogenation of the feed comprises two trickle-bed hydrogenation reactors in series in the first reaction zone and one reactor in the second reaction zone 2 for completing the conversion. Preferably most of the exothermic reactions take place in the front reactor, which consequently has higher temperature increase. When the catalyst deactivates, reaction moves gradually to the following reactor in the first hydrogenation reaction zone. This development is further illustrated in the examples through analyses relating to start of the run and end of the run conditions.

According to one embodiment of a device and process for hydrogenation comprising two reactors in the first reaction zone, it is feasible to load fresh catalyst in the front reactor after which the order of reactors within said first reaction zone can be changed.

The temperature rise in the first hydrogenation reaction zone is controlled by liquid recycle in which cooled first intermediate liquid stream is recycled from the hot high-pressure separator 3 to the first hydrogenation reaction zone inlet.

EXAMPLES

The following examples are provided to better illustrate the claimed invention and are not to be interpreted as limiting the scope of the invention. To the extent that specific materials are mentioned, it is merely for purposes of illustration and is not intended to limit the invention. Two very different hydrocarbon streams were used as feeds (referred to as feed A and feed C or feeds). One skilled in the art may develop equivalent means or reactants without the exercise of inventive capacity and without departing from the scope of the invention. It will be understood that many variations can be made in the procedures described herein while still remaining within the bounds of the present invention.

Example 1, Light Olefinic Naphtha and Middle Distillate Feed Containing Aromatics as Feeds The hydrogenation device corresponded to the embodiment described in FIG. 1. The first reaction zone comprised two hydrogenation reactors, which were operated in series. The front reactor had higher temperature increase due the exothermic reactions taking place predominantly therein. Temperature increase in the front reactor was controlled by diluting reactor feed with liquid recycled from the reactor outlet to inlet. The second reaction zone inlet temperature was not controlled but determined by the front reactor outlet temperature.

The reactor section feed consisted of fresh feed, liquid recycle, make-up hydrogen and recycle gas. Liquid recycle diluted contents of the reactive components and thus controlled temperature increase. Make-up hydrogen was added to cover hydrogen consumption in the reactions. Recycle gas was adjusted to maintain adequate hydrogen to reactive ratio in the reactor inlets.

The device was operated with two different feeds. Feed A was a light mainly C5-hydrocarbon containing olefinic naphtha and feed C a middle distillate hydrocarbon stream containing aromatics. Operation with different feeds was done in relatively short campaigns of two or three weeks. Olefin content of feed A was 30 wt-% and aromatic content of feed C was 20 wt-%.

Required reactor inlet temperature depends on the feed type and catalyst deactivation. For Feed A, the first reactor inlet temperature was 70° C. with a fresh catalyst for start of run conditions (SOR) and 150° C. with a deactivated catalyst for end of run conditions (EOR). The corresponding temperatures for Feed C were 120° C. (SOR) and 220° C. (EOR).

Separation of the recycle gas from the liquid comprising the saturated product and recycling of it with the recycle gas compressor requires low temperature in the high-pressure separator. This results in additional energy consumption, when recycle gas stream is reheated to the optimal reactor operating temperature. The heat formation of the exothermic reaction can be utilized for reactor feed heating by installing a hot high-pressure separator, from which liquid can be recycled at high temperature, whilst the cold high-pressure separator temperature is set by gas recycle requirements.

The additional improvement in this invention is that energy consumption is optimized for all design feed cases comprising both design feeds in SOR and EOR conditions. As the invention covers a wide range of feeds, with varying properties, the design feed compositions can be considered as examples illustrating different distillation ranges and reactive olefin or aromatics contents. Based on the teaching of the present invention, the energy consumption can be easily reoptimized for the feeds with properties differing from the example feeds.

To demonstrate the energy effectiveness obtained with the present invention, reactor section energy consumption was calculated with regard to reactor feed heater and at air cooling. These are given in table 1 for feeds A and C.

TABLE 1

Reactor section energy consumption according to the present invention.

| | Reactor feed heater (kW) | Air cooling (kW) |
|---|---|---|
| Feed A start of run | 140 | 1729 |
| Feed A end of run | 200 | 1790 |
| Feed C start of run | 97 | 895 |
| Feed C end of run | 1083 | 1875 |

Feed was pumped to the first reaction zone through reactor feed/effluent exchanger and reactor feed heater to the front hydrogenation reactor inlet. The reactor liquid recycle and hydrogen feed consisting of make-up hydrogen and recycle gas was mixed with the fresh feed upstream of the reactor feed heater, by which the reactor feed stream was adjusted to the desired inlet temperature.

The effluent from the first reaction zone, i.e. the first intermediate was cooled first in the reactor feed/effluent exchanger and then in air cooler and collected in the hot high-pressure separator. The hot high-pressure separator temperature was set to optimize total energy consumption.

The first intermediate from hot high-pressure separator as liquid was divided into two streams: the liquid recycle to reactor feed heater, and the second reaction zone feed. Vapor (the first intermediate gas stream) from the hot high-pressure separator was combined with the second reaction zone liquid feed. The second reaction zone converted the last traces of reactive components left in the effluent from the reactors of the first reaction zone. If the reactors in the first reaction zone function properly, the reactor in the second reaction zone should not show any temperature profile.

Effluent comprising the saturated product from the second reaction zone was further cooled to 40° C. in the air cooler and collected in the cold high-pressure separator. Pressure of the liquid from the cold high-pressure separator was reduced and sent to low pressure section for distillation.

The separated gas stream from the cold high-pressure separator was sent to the hydrogen recycle compressor suction through a knock-out drum. Recycle gas from the compressor outlet was mixed with the make-up hydrogen and sent to the reactor feed heater.

The energy economy and savings obtained by the present invention are best illustrated in table 3, where the differences in energy consumption with and without the hot high-pressure separator are listed.

Comparative Example 1, Light Olefinic Naphtha and Middle Distillate Feed Containing Aromatics as Feeds A hydrogenation of the same feeds as in example 1 was simulated. The hydrogenation device was otherwise exactly the same as in example 1, but without the hot high-pressure separator. Results calculated as energy consumption are given in table 2, where the terms are the same as in table 1.

TABLE 2

Reactor section energy consumption without hot high-pressure separator.

| | Reactor feed heater (kW) | Air cooling (kW) |
|---|---|---|
| Feed A start of run | 525 | 2114 |
| Feed A end of run | 3314 | 4904 |

TABLE 2-continued

Reactor section energy consumption without hot high-pressure separator.

|  | Reactor feed heater (kW) | Air cooling (kW) |
|---|---|---|
| Feed C start of run | 1805 | 2603 |
| Feed C end of run | 4681 | 5474 |

Table 2 shows that without the hot high-pressure separator the energy consumption is very different depending on the feed or catalyst activity. As can be seen, EOR conditions give more potential for energy savings that SOR conditions, and heavy feed more than light feed.

Comparison between tables 1 and 2 shows that energy consumption can be reduced with hot high-pressure separator. It also shows how the device utilising features of the invention is able to maximize utilisation of the energy saving potential with different feeds and catalyst lifetime.

This is further clarified in table 3 showing how energy savings (calculated as [energy consumption according to the invention]–[energy consumption of the comparative example]) are achieved with hydrogenation process according to the present invention during runs with two different feeds.

TABLE 3

Difference between reactor section energy consumptions in example 1 and comparative example 1 above.

|  | Reactor feed heater (kW) | Air cooling (kW) |
|---|---|---|
| Feed A start of run | −385 | −385 |
| Feed A end of run | −3114 | −3114 |
| Feed C start of run | −1708 | −1708 |
| Feed C end of run | −3598 | −3599 |

The energy consumption results show some of the advantages obtainable with the present hydrogenation device and process for hydrogenation of two very different feeds, namely light olefinic naphtha (Feed A) and middle distillate feed (Feed C) containing aromatics.

Example 2. Operation of All Cases at the Same Pressure and Campaign Change Without Depressurisation The hydrogenation device corresponded to the embodiment of example 1. The device was designed to operate with two different feeds. Feed A was a light mainly C5-hydrocarbon containing olefinic naphtha and feed C a middle distillate hydrocarbon stream containing aromatic compounds. Operation with different feeds was carried out in relatively short campaigns of two or three weeks. It was found that all feed cases comprising light C5 hydrocarbons as well as heavy gasoil cases can be operated at same pressure ranging from 2 to 6 MPa, when operating temperature and liquid recycle rate are optimized. The common operating pressure for all cases is advantageous in feed pump, recycle gas compressor and make up hydrogen compressor design.

Campaign change is started by reducing liquid levels in all vessels. Remaining liquid is pushed by hydrogen pressure from high-pressure reactor section to low pressure distillation section through special draining lines that have been located to avoid dead ends collecting liquid. Distillation is continued as long as possible so that on-spec product to storage is maximized. Catalyst in reactor is cleaned from hydrocarbons simultaneously by sweeping with hydrogen recycle.

By these measures, the earlier feed can be removed as well as possible so that mixing of feeds is minimized. Hydrogen pressure is maintained in the high-pressure section until the new feed is introduced. The stabilizer column is equipped with some start-up lines for filling with new feed beforehand to be able to heat the column so that it is ready to take the new feed when it arrives.

According to the present process and method, the campaign changes from one hydrocarbon stream as feedstock to another hydrocarbon stream as feedstock can be done without depressurisation of the high-pressure section, which results in savings in hydrogen consumption and time. As comparative examples, processes with pressure variations were simulated. Savings in the hydrogen consumption can be seen in the following table 4, which shows the amount of hydrogen needed for pressurisation of a high-pressure section of the hydrogenation unit designed for feed rate of 10-20 t/h when the original pressure varies between 0 and 3 MPa and the target pressure between 4 and 6 MPa.

TABLE 4

Effect of the variations in the pressure for the calculated hydrogen consumption within the high-pressure section.

|  | Original pressure 0 MPa | Original pressure 1 MPa | Original pressure 2 MPa | Original pressure 3 MPa |
|---|---|---|---|---|
| Target pressure 4 MPa | $H_2$ 290 kg | $H_2$ 223 kg | $H_2$ 149 | $H_2$ 74 kg |
| Target pressure 5 MPa | $H_2$ 365 kg | $H_2$ 298 kg | $H_2$ 223 | $H_2$ 149 kg |
| Target pressure 6 MPa | $H_2$ 439 kg | $H_2$ 372 kg | $H_2$ 298 | $H_2$ 223 kg |

The table illustrates how the pressure differences and depressurisation within the high-pressure section increases hydrogen consumption during campaign changes.

It will be apparent to a person skilled in the art that, as the technology advances, the inventive concept can be implemented in various ways. The subject matter in the above described embodiments may be combined in any permutations or manner. The same applies to subject matter of all dependent claims which may be used in any combination to restrict the independent claims. The invention and its embodiments are not limited to the examples described above but may vary within the scope of the claims.

The invention claimed is:

1. A process for hydrogenation of a hydrocarbon stream containing olefinic compounds, aromatic compounds or a combination thereof, the process comprising:
   i) feeding the hydrocarbon stream and hydrogen into a first reaction zone of a hydrogenation process unit;
   ii) hydrogenating in the first reaction zone in a presence of a catalyst at least part of said aromatic compounds, olefinic compounds or a combination thereof to produce a first intermediate;
   iii) cooling and separating said first intermediate into a first intermediate liquid stream and a first intermediate gas stream;
   iv) conducting the first intermediate gas stream to a second reaction zone of the hydrogenation process unit;
   v) conducting a portion of said first intermediate liquid stream to an inlet of the first reaction zone as a liquid recycle stream in order to restrict a temperature rise in the first reaction zone to less than 60° C., and conducting another portion of said first intermediate liquid stream to:
  a) the second reaction zone, wherein remaining aromatic compounds, olefinic compounds or a combination thereof contained in said first intermediate liquid stream are hydrogenated with the first intermediate gas stream in a presence of a catalyst to produce a saturated product, or
  b) a liquid bypass line, which bypasses the second reaction zone, wherein said first intermediate liquid stream contains a saturated product;
vi) separating the saturated product obtained from said second reaction zone or said liquid bypass line into a liquid product stream and a separated gas stream; and
vii) recovering the liquid product stream from the hydrogenation process unit,
wherein said steps from i) to vii) are conducted within a high-pressure section and are conducted at a constant set pressure selected from 2-8 MPa.

2. The process according claim 1, wherein the hydrocarbon stream comprises:
olefinic compounds selected to be at least one of less than 70 wt-%, less than 50 wt-%, or less than 30 wt-% of a total feed mass.

3. The process according claim 1, wherein the hydrocarbon stream comprises:
aromatic compounds selected to be at least one of less than 70 wt-%, less than 50 wt-%, or less than 30 wt-% of a total feed mass.

4. The process according to claim 1, wherein the separating in step iii) is performed with at least one hot high-pressure separator.

5. The process according to claim 4, wherein the hydrocarbon stream containing olefinic compounds, aromatic compounds or a combination thereof fed to the process is a hydrocarbon fraction comprising hydrocarbons wherein 90%-wt of the hydrocarbons have:
  a. a distillation range defined by an initial boiling point from −10 to 230° C., and a final boiling point up to 330° C. according to standard ASTM D-86; and
  b. a carbon number range wherein a difference between a lower carbon number limit and higher carbon number limit is selected to be at least one of from 0 to 5, or from 0 to 3, and said carbon number range is a subrange of carbon numbers from C4 to C17.

6. The process according to claim 5, comprising:
fractionating the liquid product stream into fluids of defined boiling ranges.

7. The process according to claim 6, comprising:
contacting the hydrocarbon stream with hydrogen in step ii) in an amount of 25 to 500 $Nm^3$ hydrogen/$m^3$ hydrocarbons of the feedstock, at a temperature from 50 to 270° C., and at a LHSV from 0.2 to 10 1/h.

8. The process according to claim 7, for a change from a current campaign operating with the hydrocarbon stream to a next campaign with another hydrocarbon stream as a feed, further comprising:
keeping a pressure within the high-pressure section essentially constant;
flushing catalysts in first and second hydrogenation zones with hydrogen; and
draining remaining hydrocarbon liquids from the hydrogenation process unit.

9. The process according to claim 8, wherein the feed hydrocarbon stream comprises:
olefinic compounds selected to be at least one of less than 70 wt-%, less than 50 wt-%, or less than 30 wt-% of a total feed mass.

10. The process according to claim 8, wherein the hydrocarbon stream as a feed comprises:
aromatic compounds selected to be at least one of less than 70 wt-%, less than 50 wt-%, or less than 30 wt-% of a total feed mass.

11. The process according to claim 8, wherein the hydrocarbon stream as a feed comprises:
a combination of olefinic compounds and aromatic compound.

12. The process according to claim 1, wherein the hydrocarbon stream containing olefinic compounds, aromatic compounds or a combination thereof fed to the process is a hydrocarbon fraction comprising hydrocarbons wherein 90%-wt of the hydrocarbons have:
  a. a distillation range defined by an initial boiling point from −10 to 230° C., and a final boiling point up to 330° C. according to standard ASTM D-86; and
  b. a carbon number range wherein a difference between a lower carbon number limit and higher carbon number limit is selected to be at least one of from 0 to 5, or from 0 to 3, and said carbon number range is a subrange of carbon numbers from C4 to C17.

13. The process according claim 12, wherein said hydrocarbon stream is obtained from fossil sources, renewable sources or any combination thereof.

14. The process according to claim 1, comprising:
conducting said separated gas stream from step vi) as hydrogen recycle stream to the inlet of the first reaction zone.

15. The process according to claim 1, comprising:
fractionating the liquid product stream from step vii) into fluids of defined boiling ranges.

16. The process according to claim 15, comprising:
performing the fractionating at a pressure from 1 kPa to 1 MPa absolute.

17. The process according to claim 1, comprising:
contacting the hydrocarbon stream with hydrogen in step ii) in an amount of 25 to 500 $Nm^3$ hydrogen/$m^3$ hydrocarbons of the feedstock, at a temperature from 50 to 270° C., and at a LHSV from 0.2 to 10 1/h.

18. The process according to claim 1, for a change from a current campaign operating with the hydrocarbon stream to a next campaign with another hydrocarbon stream as a feed, further comprising:
keeping a pressure within the high-pressure section essentially constant;
flushing catalysts in the first reaction zone and the second reaction zone with hydrogen; and
draining remaining hydrocarbon liquids from the hydrogenation process unit.

19. The process according to claim 18, comprising:
performing the flushing with hydrogen selected from once through hydrogen or recycle hydrogen.

\* \* \* \* \*

UNITED STATES PATENT AND TRADEMARK OFFICE
CERTIFICATE OF CORRECTION

| | | |
|---|---|---|
| PATENT NO. | : 10,793,789 B2 | Page 1 of 1 |
| APPLICATION NO. | : 16/374235 | |
| DATED | : October 6, 2020 | |
| INVENTOR(S) | : Hanna Honkanen et al. | |

It is certified that error appears in the above-identified patent and that said Letters Patent is hereby corrected as shown below:

On the Title Page

Item (73) Assignee:
NESTEC OYJ, Espoo (FI) should read NESTE OYJ, Espoo (FI).

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*